US006351725B1

United States Patent
Willis et al.

(10) Patent No.: US 6,351,725 B1
(45) Date of Patent: Feb. 26, 2002

(54) INTERFACE APPARATUS

(75) Inventors: Trevor Edward Willis; Adrian Michael Suggett, both of Buckinghamshire (GB)

(73) Assignee: Madge Networks Limited, Buckinghamshire (GB)

( * ) Notice: Subject to any disclaimer, the term of this patent is extended or adjusted under 35 U.S.C. 154(b) by 0 days.

(21) Appl. No.: 08/454,268

(22) PCT Filed: Jan. 18, 1994

(86) PCT No.: PCT/GB94/00094

§ 371 Date: Jul. 18, 1995

§ 102(e) Date: Jul. 18, 1995

(87) PCT Pub. No.: WO94/17476

PCT Pub. Date: Aug. 4, 1994

(30) Foreign Application Priority Data

Jan. 19, 1993 (GB) .............................................. 9300913

(51) Int. Cl.[7] .............................................. G06F 9/455
(52) U.S. Cl. .......................................... 703/25; 710/127
(58) Field of Search ............................... 395/500, 200.2;
370/800, 363, 257, 469; 703/25, 24, 21;
710/127, 130; 709/212, 213

(56) References Cited

U.S. PATENT DOCUMENTS

| 5,168,561 A | | 12/1992 | Vo ............................... 395/425 |
| 5,299,313 A | * | 3/1994 | Petersen et al. ........... 395/200.2 |
| 5,305,317 A | * | 4/1994 | Szczepanek ................. 370/463 |

FOREIGN PATENT DOCUMENTS

| EP | 0290172 | 11/1988 |
| WO | 88/03292 | 5/1988 |

OTHER PUBLICATIONS

*IBM Technical Disclosure Bulletin*, vol. 29, No. 2, Jul., 1986, New York, pp. 864–868, "Hardware–Assisted Byte–Alignment for High–Speed Digital Communications Porcessors."

* cited by examiner

Primary Examiner—Kevin J. Teska
Assistant Examiner—Vuthe Siek
(74) Attorney, Agent, or Firm—Sughrue, Mion, Zinn, Macpeak & Seas, PLLC

(57) ABSTRACT

Interface apparatus for connection between a data handling device and a data communication medium to enable data to be transferred between the device and the medium, is constituted, inter alia, by a data alignment device (7, 8) coupled in use to the data handling device. A memory (5, 6) is coupled for data transfer to the data alignment device (7, 8) and includes a number of substantially identical subsidiary, First-In-First-Out (FIFO) memories arranged in parallel. The number of subsidiary memories is chosen such that their overall width is at least equal to the longest length of data to be transferred between the memory (5, 6) and the alignment device (7, 8) in a single transfer step and the width of each subsidiary memory is equal to the shortest length of data to be transferred between the memory and the alignment device in a single transfer step. The data alignment device (7, 8) has a number of first ports, one connected to each of the subsidiary FIFOs and a corresponding number of second ports connected in use to the data handling device. Connections are provided for connecting any first port to any second port and a controller (9) controls operation of the data alignment device (7, 8) such that in any transfer step, data having a length corresponding to an integer multiple of the shortest length of data can be transferred between the memory (5, 6) and the second ports of the data alignment device with the order of data within the length of data being determined by the connections between the first and second ports of the data alignment device (7, 8).

7 Claims, 6 Drawing Sheets

INTERFACE APPARATUS

The invention relates to interface apparatus for connection between a data handling device and a data communication medium to enable data to be transferred between the device and the medium.

A typical example of such interface apparatus is an adaptor card for connection between a data processor such as a PC and a communication network such as a FDDI network.

Currently there are three basic architectures for such interface apparatus. In the Bus Master architecture, data is transferred directly from the adapter card to the PC memory using direct memory access (DMA) operations. While this system is very fast it suffers from the disadvantage that once receive frames are copied into the PC they may have to be transferred elsewhere (typically by the PC copying the frame byte by byte) once the receive data has been examined. Much of the copying may just be necessary to shift the data so that a particular sequence of bytes within the frame starts on a word or long word boundary within memory.

In the Shared RAM architecture, the adapter card contains an area of RAM that is visible to the main PC processor. Received frames are placed into this RAM on the adapter card and then copied from the RAM on the adapter card to the main PC memory by the PC's processor.

In the Programmed Input Output (PIO) approach, the adapter card is sent the frame through a fixed size (typically 8, 16 or 32 bit) I/0 location under CPU Control. These transfers, being driven by the host processor, suffer performance limitations.

In accordance with the present invention, interface apparatus for connection between a data handling device and a data communication medium to enable data to be transferred between the device and the medium comprises a data alignment device coupled in use to the data handling device; a memory coupled, for data transfer, to the data alignment device, the memory including a number of substantially identical subsidiary, First In-First Out (FIFO) memories arranged in parallel, the number of subsidiary memories being chosen such that their overall width is at least equal to the longest length of data to be transferred between the memory and the alignment device in a single transfer step and the width of each subsidiary memory being equal to the shortest length of data to be transferred between the memory and the alignment device in a single transfer step; the data alignment device having a number of first ports, one connected to each of the subsidiary FIFOs and a corresponding number of second ports connected in use to the data handling device, and means for connecting any first port to any second port; and control means for controlling operation of the data alignment device such that in any transfer step, data having a length corresponding to an integer multiple of the said shortest length of data can be transferred between the memory and the second ports of the data alignment device with the order of data within the length of data being determined by the connections between the first and second ports of the data alignment device.

The memory may be used as a "transmit" memory to enable data to be transferred from the data handling device to the data communication medium or as a "receive" memory to handle data transfer from the medium to the data handling device. In practice, the interface apparatus will typically comprise two such memories, a transmit memory and a receive memory with respective data alignment devices.

The invention enables data of varying length to be sent to or read from the memory without the need to load large blocks of data into another memory of for example a CPU to enable it to be examined. Thus, where the data handling device comprises a PC, this will not have to copy data to align the data correctly in memory for a particular computer protocol, data (even within the same frame) can be copied between the PC and the interface apparatus either by the PC processor or by supporting DMA circuits, and the overhead on the PC's CPU is minimised for each frame transferred. Most importantly, the data transfer is not limited to a fixed size as with PIO. Instead varying integer multiples of the shortest length of data (1 byte) can be transferred.

Typically, the subsidiary FIFOs may be implemented as RAM with extra control circuits, as dedicated FIFO devices, or in VRAM.

In some cases, there may be a common data alignment device for both the transmit and receive memories since, where the data handling device is connected to the apparatus via a computer bus, such a bus cannot normally transmit and receive simultaneously. However, separate data alignment devices could be provided for each of the receive and transmit memories.

Preferably, one or more additional memories such as FIFOs are provided in parallel with the or each of the receive and transmit memories. This allows status information such as start and end of frame information together with any error indications in receive frames to be kept adjacent to the correct data.

The data handling device can comprise a computer such as a PC but also any other high speed peripheral device. Furthermore, the data handling device could be defined by both a processor (CPU) and a direct memory access (DMA) device with the CPU handling certain parts of the data transfer and the DMA the other parts. In particular, where the data defines a frame, the CPU could take part in the transfer of the frame header while the DMA device can control the transfer of information content.

The communication medium can be any kind of medium such as a token ring but the invention is particularly suited for use with a FDDI network.

An example of interface apparatus according to the invention will now be described with reference to the accompanying drawings, in which.

Figure 1:
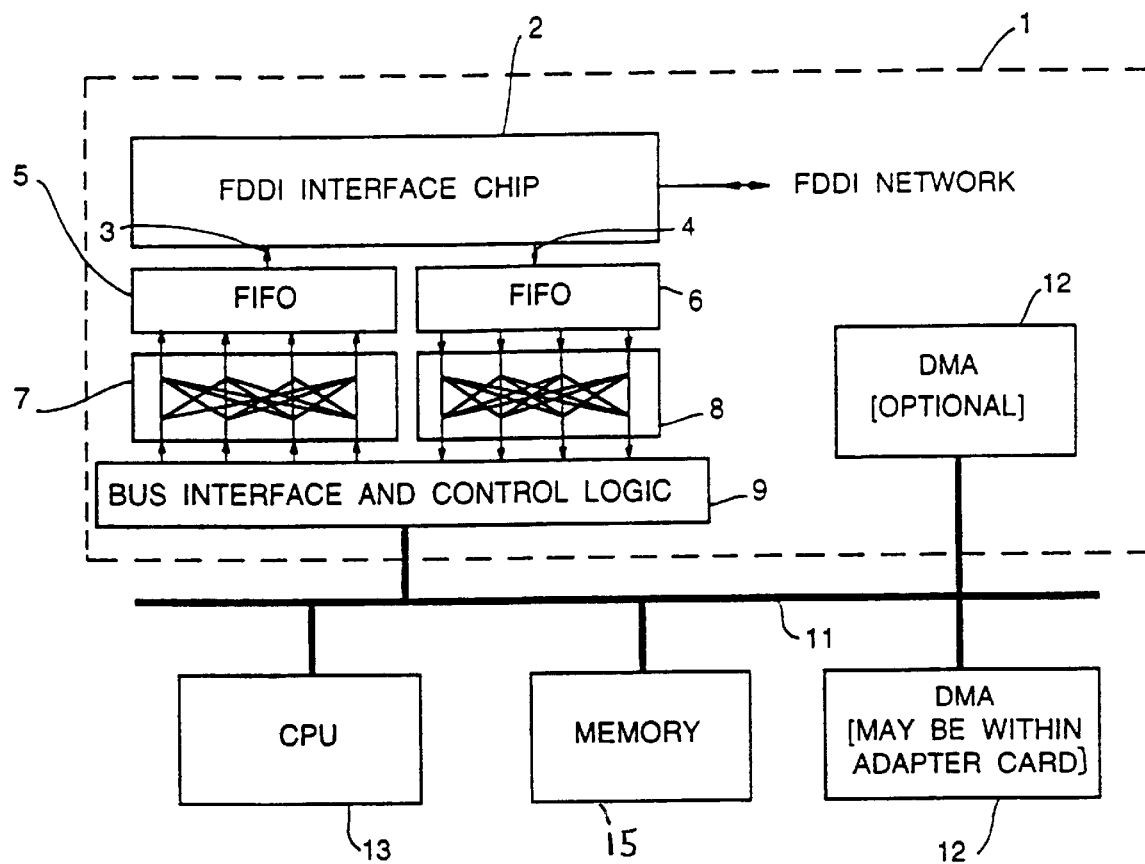
FIG. 1 illustrates the architecture of the adaptor.

FIG. 1 illustrates in schematic form an adaptor card 1, including a FDDI interface circuit 2 connected to a computer bus 11. A PC processor (CPU) 13 and memory 15 together with optional DMA 12 are also connected to the computer bus. The circuit 2 is of conventional form and in this example has a 32 bit input port 3 for receiving portions of frames to be transmitted on the network and a 32 bit output port 4 for receiving portions of frames to be sent to the computer bus 11. Although the circuit is described with reference to 32 bit ports in this example, it is equally applicable to other sizes for example 16 bit or 64 bit ports for connection to 16 or 64 bit FIFOs respectively.

Mounted on the adapter card 1 is a 32 bit transmit FIFO 5 coupled in use to the input port 3 and a 32 bit receive FIFO 6 connected in use to the output port 4. Each of the FIFOs is formed of four subsidiary FIFOs 5A–5D, 6A–6D respectively (FIGS. 2 and 7), each subsidiary FIFO being 8 bits wide (ie 1 byte)

The adapter card 1 also supports a pair of byte alignment devices 7,8 each having four input ports and four output ports. Each input port is connectable with any one of the output ports under the control of bus interface and control logic 9 also mounted on the card 1. As can be seen from FIG. 1, therefore, on the transmit side, a byte which is sent to the byte alignment device 7 can be routed to any one of the four subsidiary FIFOs 5A–5D. Correspondingly, on the receive side, the contents of any of the subsidiary FIFOs 6A–6D can be routed to any one of the output ports of the byte alignment device 8.

Effectively, the adapter card 1 appears as two 32 bit mail boxes. On transmit any combination of bytes, words (2 bytes), and double words (4 bytes) can be written with any byte alignment using either the processor 13 on the PC mothercard or a separate DMA device 12 on the adapter card (or as part of the mothercard). The alignment logic will ensure that the data is assembled into contiguous memory within the FIFOs. On transmit typically the processor would write the header for the protocol in use (the first few bytes of the frame to be sent), and the DMA engine 12 write the data part on the frame into the adapter card. There is no need to use the PC's processor 13 to assemble all the fragments of a frame to transmit into one contiguous block of memory.

On receive the processor 13 may read bytes, words or double words as required by the protocol of the received frame to decode where the remainder of the frame should be copied (either under processor control or by the DMA engine).

An example of a receive operation will now be described with reference to FIGS. 2 to 6. In this case, a received FDDI frame is shown containing part of a file being transferred under a TCP/IP protocol. The protocol header is in three parts: FDDI, IP and TCP headers. The size of the FDDI, IP and TCP headers has been reduced for the purposes of this explanation. (In practice each of these protocol headers may be up to 30 bytes long.) Each of these header components must be analysed in turn before the subsequent header layer can be decoded. The receive and transmit FIFOs may contain more than one frame in normal operation. Only one frame has been illustrated to simplify the explanation.

In operation, therefore, a frame arrives on the network at the interface circuit 2 and successive bytes of the frame are supplied to successive locations in the subsidiary FIFOs 6A–6D in sequence. Thus the first byte of the FDDI header is supplied to the first location in the FIFO 6A, the second byte to the first location in the FIFO 6B, the third byte to the first location in the FIFO 6C and the fourth byte to the first location in the FIFO 6D. The remaining two bytes of the FDDI header are supplied to the FIFOs 6A, 6B in sequence with the result that the preceding bytes in the FIFOs 6A, 6B are transferred towards the output of those FIFOs. Next, the three bytes of the IP header are loaded in a similar fashion followed by the five bytes of the TCP header. Following this, the information frame which may amount to several thousand bytes is loaded followed finally by an end byte which is loaded into a status FIFO 10. At this stage, the memory 6 holds the information in the form shown in FIG. 2.

In a second implementation, the length and status of each received frame is written into the status FIFO 10 and the CPU/DMA can then recover the status and length of the received frame before processing the header.

Figure 2:
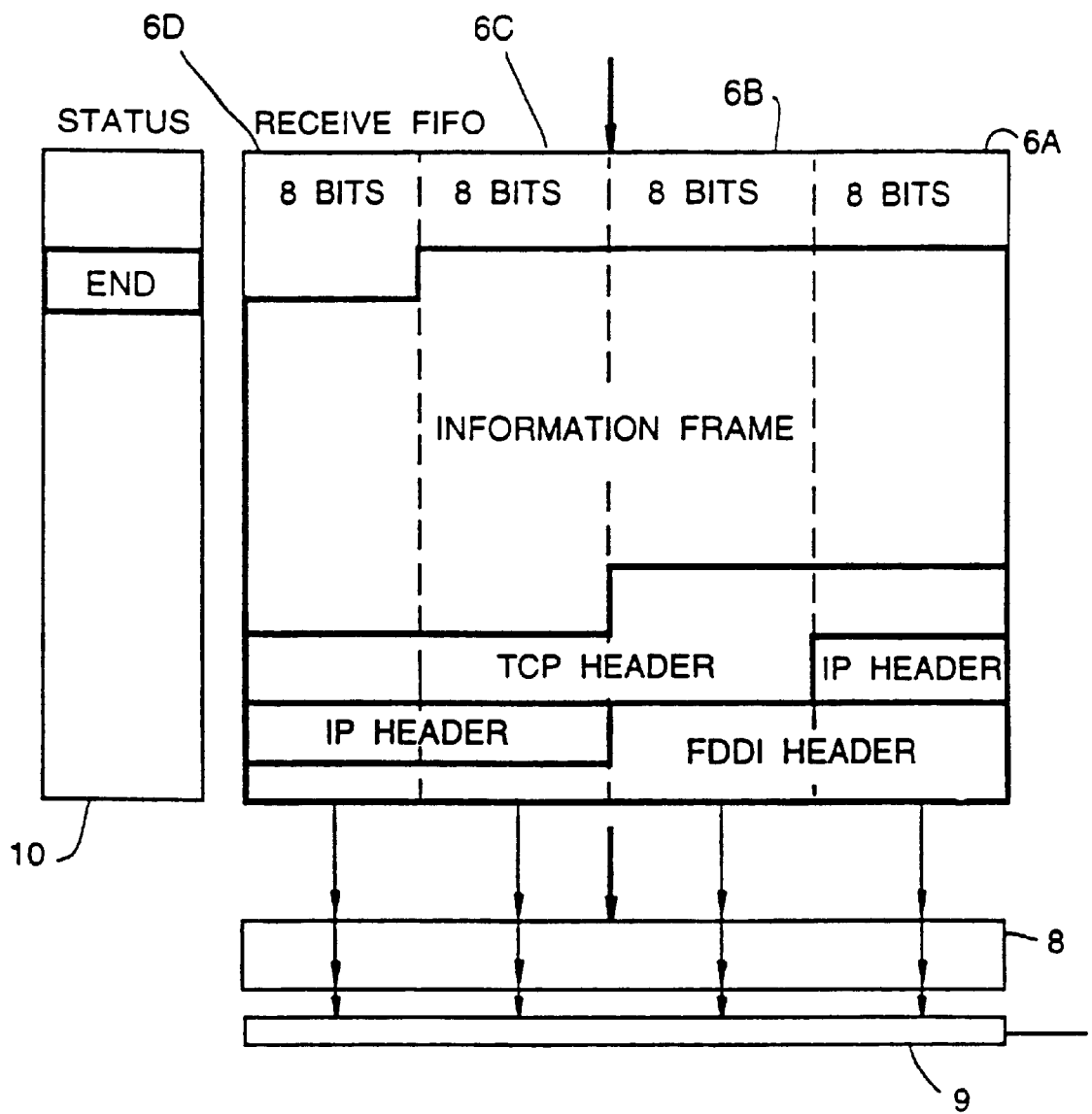
FIGS. 2 to 6 illustrate different stages in a data receive process.

The CPU 13 then needs to read the FDDI header. This is achieved in a first transfer step by setting the data alignment device 8 to connect the input ports, as shown in FIG. 2, to its output ports which are in turn connected to the bus interface 9 such that the leading bytes in the four FIFO 6A–6D pass through the alignment device 8 in the same order to the interface 9. The CPU 13 then reads these four bytes and then needs to obtain the remaining two bytes of the FDDI header. These are obtained by loading the two bytes which are now the leading bytes in the FIFOs 6A, 6B through the alignment device 8 in the same order into the interface 9.

Figure 3:
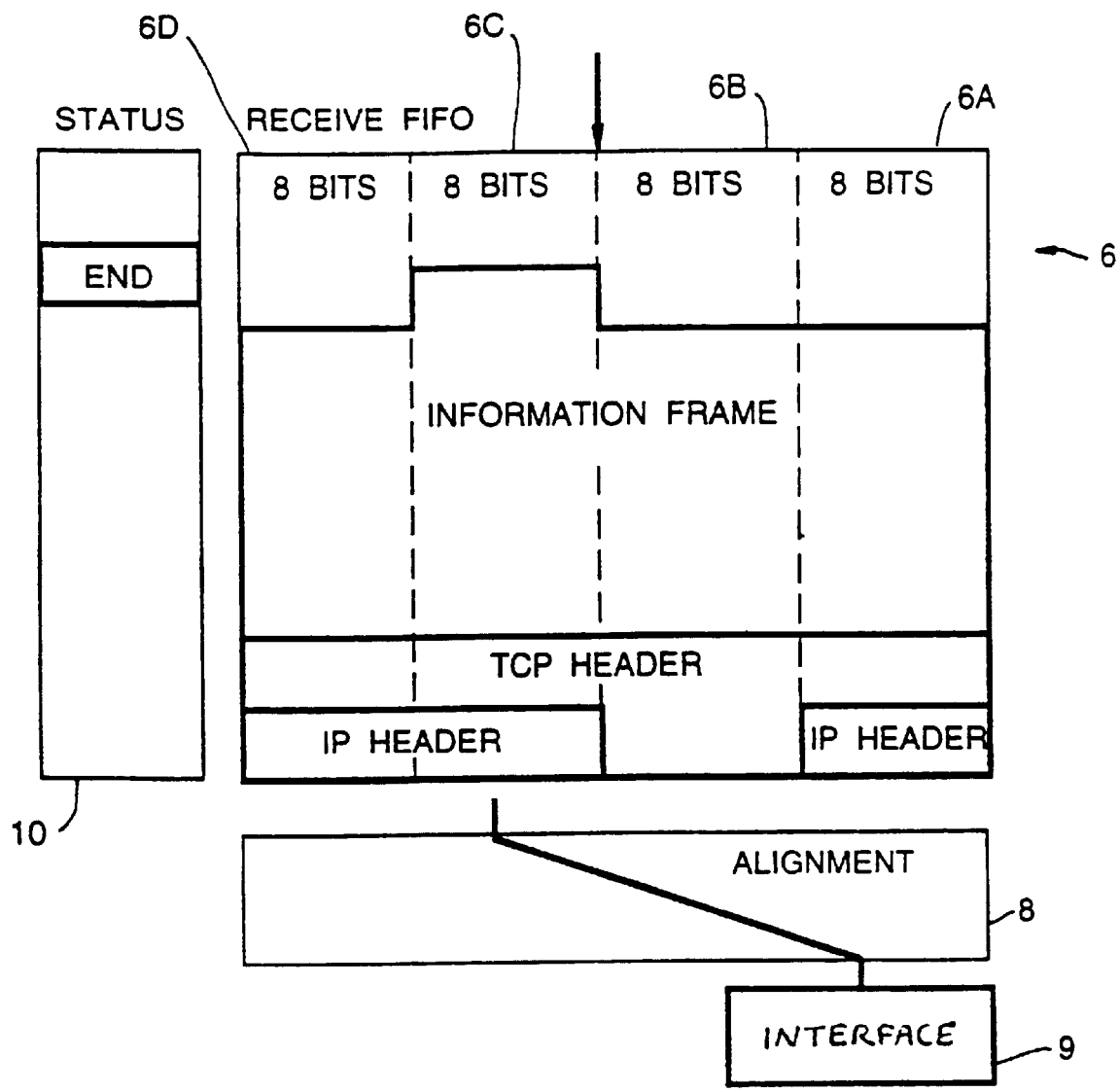
Figure 4:
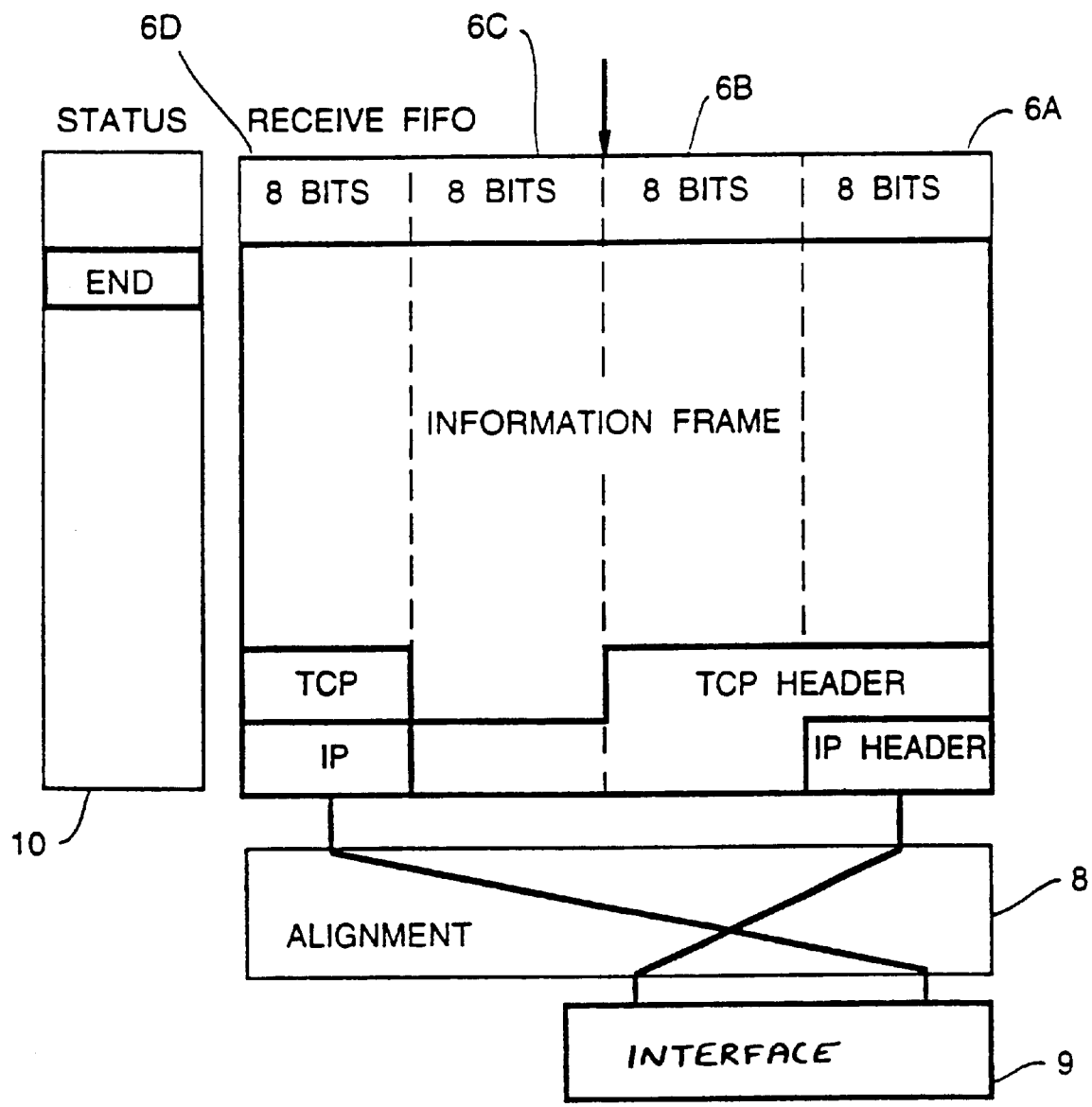

At this stage, the contents of the FIFOs 6A–6D is as shown in FIG. 3. The CPU then needs to read the IP header. The control logic 9 will have maintained a pointer to the next byte of data to be read from the receive memory 6 and as a result the control logic will pass the first byte of the IP header from FIFO 6C to the bus interface 9 as shown in FIG. 3 by suitably connecting the required ports of the alignment device 8. The action of the CPU 13 in trying to read the byte causes the alignment logic to select and read the correct byte and align it correctly on the computer bus for the CPU. It should be noted that the operation of the alignment logic is effectively "invisible" to the CPU. The CPU simply asks for the size of data it wishes to receive. This information is encoded in the memory read request on the computer bus. The alignment logic selects and aligns the correct data from the FIFO and repeats the read operation, returning the requested data to the CPU. In this simplified example, the CPU 13 would process the first IP byte and determine that an additional word (2 bytes) needs to be read to complete the IP protocol header. The CPU then issues a word read command and receives the remainder of the IP header as shown in FIG. 4. In response to this word read command, the alignment device 8 is controlled to access the leading bytes from the FIFOs 6D and then 6A which are passed to the computer bus 11 via the interface 9. It should be noted that no byte masking or rotation operations have been required by the CPU to isolate the IP header information.

The TCP header can then be read and processed in a similar manner. For example, the CPU can read the TCP header as a byte followed by a 32 bit double word.

Figure 5:
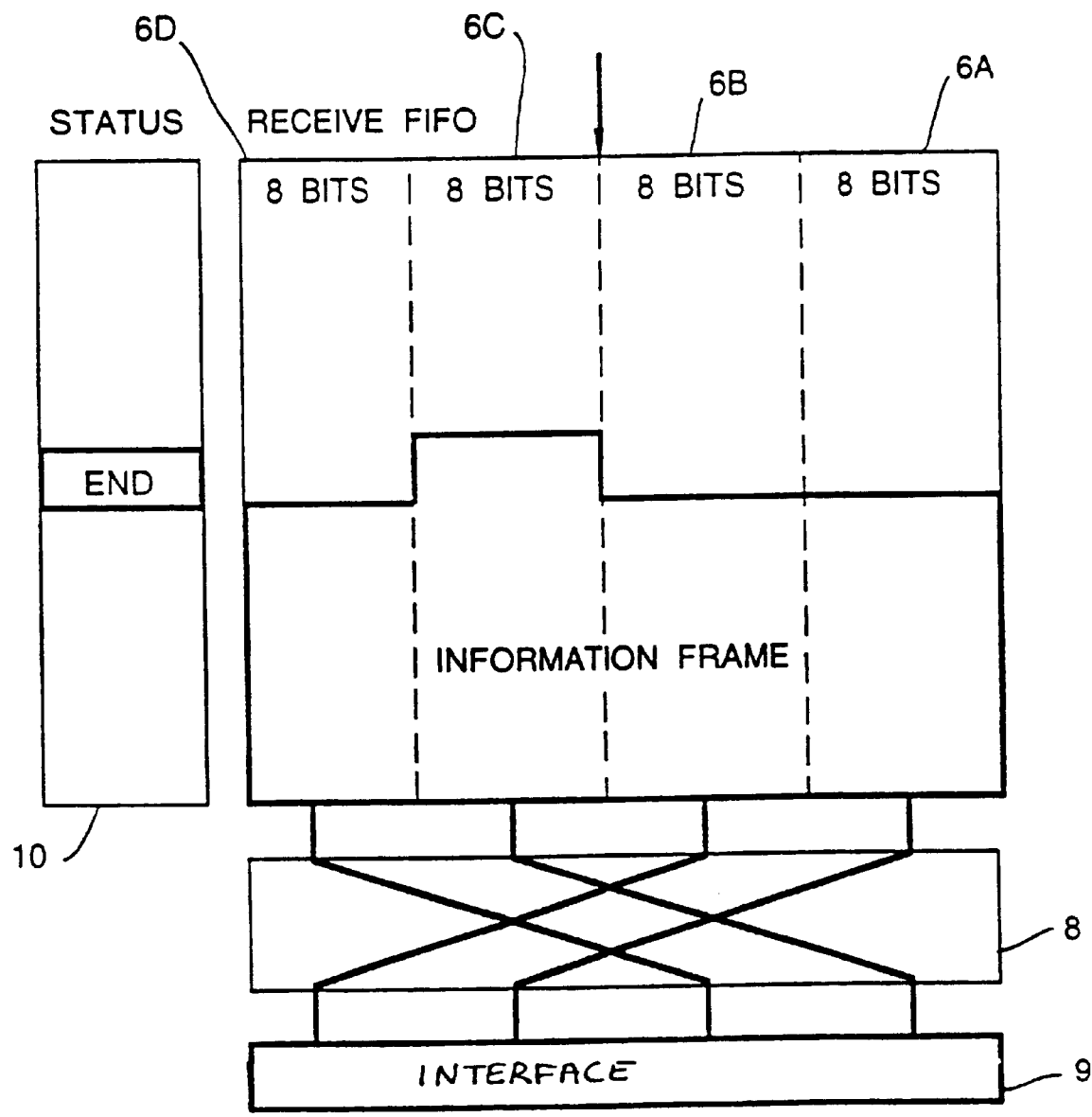

At this stage, as shown in FIG. 5, only the information field remains in the memory 6. This can then be read out by the CPU 13 or instead by the DMA 12. As can be seen from FIG. 2, the first two bytes in the information frame are contained in the FIFOs 6C, 6D and thus, as can be seen in FIG. 5, the alignment device 8 must be set up to reverse the order of adjacent pairs of bytes read from the FIFOs 6A–6D in each transfer step to obtain the correct order of the information data. The 32 bit values in the interface 9 are read by the DMA controller.

Figure 6:
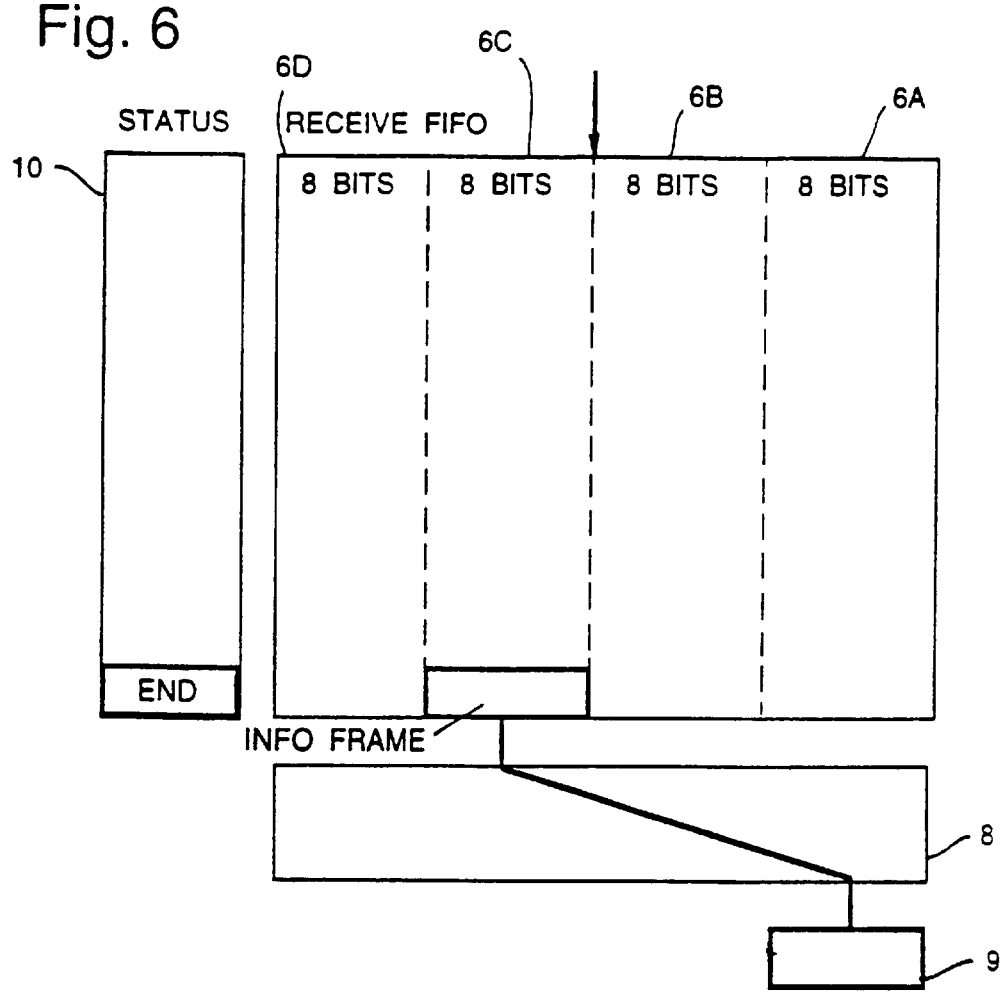

The final byte of the frame could then be read automatically using a sophisticated DMA controller 12 or by the CPU 13, this final step being shown in FIG. 6.

Figure 7:
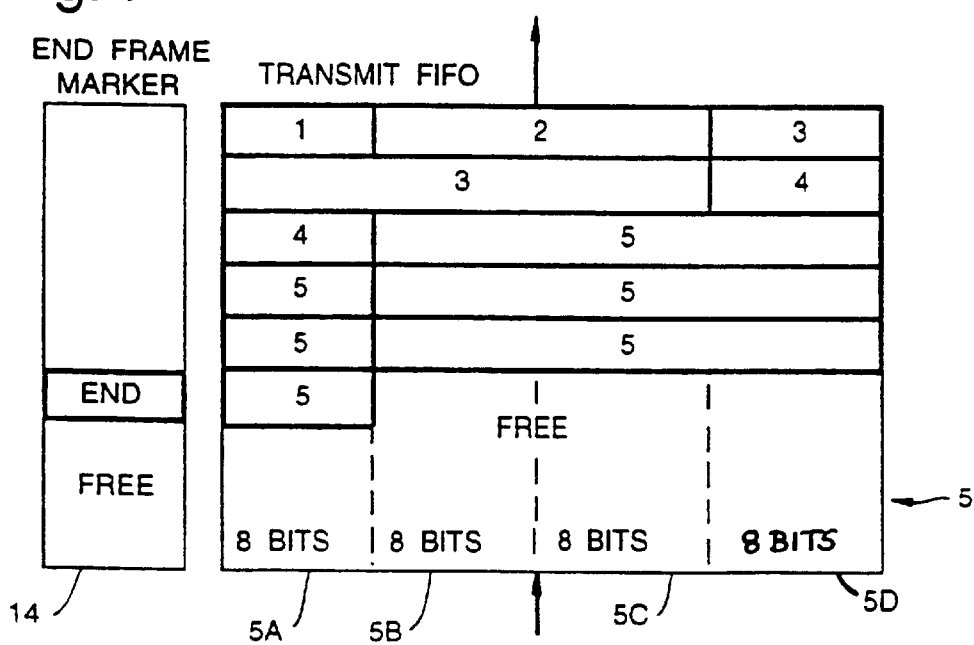
FIG. 7 illustrates part of a data transmit process

An example of a transmit sequence will now be described. FIG. 7 illustrates the FIFO 5 in more detail and shows an additional FIFO 14 positioned alongside. The status FIFO 14 can be loaded with status information such as end of frame data. FIG. 7 shows the contents of the FIFO 5 and FIFO 14 after all the data for an arbitrary short frame has been written and before the frame is transmitted. The data will have been written in the following manner:
1. One byte by the processor.
2. One word (2 bytes) by the processor.
3. One longword by the processor.
4. One word by the processor.
5. Three longwords by the DMA controller.
6. End of frame marker.

Following this sequence, the FIFOs 5,14 contain the information as shown in FIG. 7. The contents of the FIFO's 5,14 are then read out through the input port 3 onto the FDDI network.

The loading of the FIFOs 5,14 is under the control of the control logic 9 which maintains a record of the last location filled and arranges for the next data to be loaded into the next free location in the FIFO 5 by suitably controlling the byte alignment device 7 in a similar way to the control of the device 8.

What is claimed is:

1. Interface apparatus for connection between a data handling device and a data communication medium to enable data to be transferred between the device and the medium, the apparatus comprising a data alignment device coupled in use to the data handling device; a memory coupled for data transfer to the data alignment device, the memory including a number of substantially identical subsidiary, First-In-First-Out (FIFO) memories arranged in parallel, the number of subsidiary memories being chosen such that an overall width of said subsidiary memories is at least equal to the longest length of data to be transferred between the memory and the alignment device in a single transfer step and the width of each subsidiary memory being equal to the shortest length of data to be transferred between the memory and the alignment device in a single transfer step; the data alignment device having a number of first ports, one connected to each of the subsidiary FIFOs and a corresponding number of second ports connected in use to the data handling device, and means for connecting any first port to any second port; and control means for controlling operation of the data alignment device such that in any transfer step, data having a length corresponding to an integer multiple of the said shortest length of data can be transferred between the memory and the second ports of the data alignment device with the order of data within the length of data being determined by the connections between the first and second ports of the data alignment device.

2. Apparatus according to claim 1, comprising two of said memories and associated data alignment devices, one of the memories comprising a transmit memory for handling transmission of data to the data communication medium and the other comprising a receive memory for handling reception of data from the data communication medium.

3. Apparatus according to claim 1, wherein each subsidiary FIFO has a width of 1 byte (8 bits).

4. Apparatus according to claim 1, wherein each memory has four subsidiary FIFOS.

5. A data communication station comprising a data handling device; and interface apparatus according to claim 1 connected to the data handling device and for connection to a data communication medium.

6. A station according to claim 5, wherein the interface apparatus is adapted for connection to a FDDI network.

7. A station according to claim 5, wherein the data handling device comprises a processor and a direct memory access device.

* * * * *